K. H. LOOMIS.
NUT-LOCK.

No. 179,931.

Patented July 18, 1876.

WITNESSES
Franck L. Ouvrard
C. L. Everitt

INVENTOR
Kellogg H. Loomis
By Alexander Mason
Attorneys.

UNITED STATES PATENT OFFICE.

KELLOGG H. LOOMIS, OF NEW YORK, ASSIGNOR OF ONE-HALF HIS RIGHT TO JOHN A. LIGHTHALL, OF SYRACUSE, NEW YORK.

IMPROVEMENT IN NUT-LOCKS.

Specification forming part of Letters Patent No. 179,931, dated July 18, 1876; application filed January 7, 1876.

*To all whom it may concern:*

Be it known that I, KELLOGG H. LOOMIS, of New York, in the county of New York, and in the State of New York, have invented certain new and useful Improvements in Nut-Lock Washers; and do hereby declare that the following is a full, clear, and exact description thereof, reference being had to the accompanying drawings, and to the letters of reference marked thereon, making a part of this specification.

My invention relates to washers used for locking the nuts screwed up against them; and it consists in a corrugated washer, having its surface-lines running radially to a central point, or in other words all diametrical lines will cross the same central point, as will be hereinafter more fully set forth.

In order to enable others skilled in the art to which my invention appertains to make and use the same, I will now proceed to describe its construction and operation, referring to the annexed drawing, in which—

Figure 1:
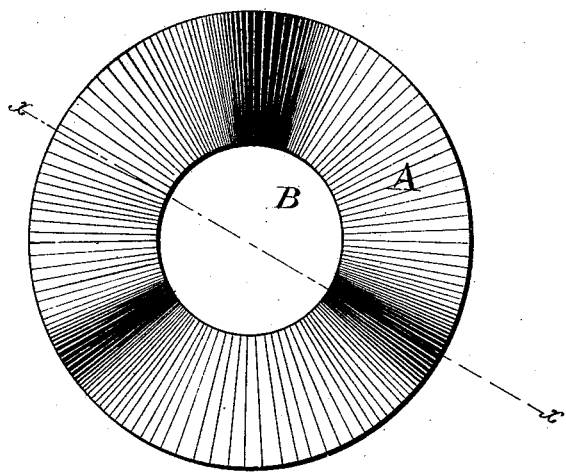
Figure 2:

Figure 1 is a plan view of my invention. Fig. 2 is a section of the same through the line *x x*, Fig. 1.

My nut-locking washer, A, is made in circular form with a central bolt-hole, B, stamped with suitable dies in the usual manner. After the washer is thus cut out it is placed between suitable stamping-dies under a hammer or other device, and formed with a series of radial corrugations of uneven number, as shown at *a a*. These corrugations are made inclined from the inner to the outer circumference in such a manner that all the surface-lines will run radially from the same central point, or, in other words, all diametrical surface-lines will cross each other at the same point in the center.

By this construction of the washer, when the nut is screwed up it will come in contact with the washer only at the outer circumference at the top of each corrugation, but still make a smooth surface for the under side of the nut to bear against, the nut being held from turning on the bolt by the tension of the washer.

The strength of the metal of which the washer is formed is preserved by having the corrugations made on the incline, as shown and described, as the strain, in so shaping the washer, is equal on all parts, and the fibers of the metal do not become broken.

I am aware that a square washer having its corners bent alternately in opposite directions, is not new, but in such washer there are sharp corners which, being of steel, will necessarily make grooves or cuts in the nut. My washer forms a smooth spring-surface, and the nut is held entirely by the elasticity of the washer.

Having thus fully described my invention, what I claim as new, and desire to secure by Letters Patent, is—

A nut-locking washer, made in circular form, with a series of radial corrugations inclined toward the center, and all diametrical surface-lines crossing the same central point, substantially as and for the purposes herein set forth.

In testimony that I claim the foregoing I have hereunto set my hand this 15th day of September, 1875.

K. H. LOOMIS.

Witnesses:
I. A. BIGGS,
A. B. CHALMERS.